United States Patent
Fisher et al.

(10) Patent No.: US 7,368,663 B1
(45) Date of Patent: May 6, 2008

(54) ANAEROBIC WIRE CONNECTOR SEALANT AND MOISTURE RESISTANT WIRE CONNECTOR CONTAINING THE SAME

(75) Inventors: Edward A. Y. Fisher, Rocky Hill, CT (US); Marcus K. Kloepping, Granger, IA (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 11/555,732

(22) Filed: Nov. 2, 2006

(51) Int. Cl.
*H02G 15/02* (2006.01)

(52) U.S. Cl. .................. 174/74 R; 174/77 R; 174/84 R

(58) Field of Classification Search .................. 174/36, 174/84 R, 84 C, 86, 87, 88 R
See application file for complete search history.

(56) References Cited

U.S. PATENT DOCUMENTS

| | | | | |
|---|---|---|---|---|
| 3,519,707 A | * | 7/1970 | Krup | 264/249 |
| 3,783,177 A | * | 1/1974 | Kelso | 174/87 |
| 3,889,047 A | * | 6/1975 | Carver | 174/84 R |
| 3,934,076 A | * | 1/1976 | Smith | 174/87 |
| 4,227,040 A | * | 10/1980 | Scott | 174/87 |
| 4,288,657 A | * | 9/1981 | Swanson | 174/87 |
| 4,691,079 A | * | 9/1987 | Blaha | 174/87 |
| 5,023,401 A | * | 6/1991 | Clifton | 174/87 |
| 5,023,402 A | * | 6/1991 | King et al. | 174/87 |
| 5,132,494 A | * | 7/1992 | Burton et al. | 174/87 |
| 5,151,239 A | * | 9/1992 | King, Jr. | 264/272.11 |
| 5,170,017 A | * | 12/1992 | Stanevich et al. | 174/153 G |
| 5,260,515 A | * | 11/1993 | Braun, Jr. | 174/87 |
| 5,302,627 A | * | 4/1994 | Field et al. | 522/13 |
| 5,315,066 A | * | 5/1994 | Spiteri, Sr. | 174/87 |
| 5,431,758 A | * | 7/1995 | Delalle | 156/49 |
| 5,557,069 A | * | 9/1996 | Whitehead et al. | 174/87 |
| 5,557,070 A | * | 9/1996 | Tamm | 174/87 |
| 5,559,307 A | * | 9/1996 | Whitehead et al. | 174/87 |
| 5,631,445 A | * | 5/1997 | Herster | 174/151 |
| 5,894,110 A | * | 4/1999 | Simmons et al. | 174/87 |
| 6,198,049 B1 | * | 3/2001 | Korinek | 174/87 |
| 6,515,043 B2 | * | 2/2003 | Petty et al. | 523/212 |
| 6,958,449 B1 | * | 10/2005 | Ziebart et al. | 174/84 R |

OTHER PUBLICATIONS

Henkel Technologies, Technical Data Sheets for Loctite 518, Dec. 2005, pp. 1-3.*
Henkel Technologies, Technical Data Sheets for Loctite 515, Sep. 2002, pp. 1.3*

\* cited by examiner

Primary Examiner—William H. Mayo, III
(74) Attorney, Agent, or Firm—Steven C. Bauman

(57) ABSTRACT

A waterproof electrical connection includes a wire connector including a housing having a cavity and an insert having a surface adapted for receiving at least two metallic wires disposed within the cavity of the housing; at least two metallic wires having exposed metallic surfaces, wherein a portion of the exposed surface of one wire is in contact with a portion of the exposed surface of the second wire, and further wherein a portion of the exposed surfaces of the at least two wires are in contact with the surface of the insert to define at least one contact point; and an anaerobic sealant disposed within the cavity, wherein only a portion of the anaerobic sealant proximal to the one at least contact point is in a cured state while the remaining sealant is in an uncured state. The connection may further include an air permeable cap disposed over the open end of the housing. The sealant is a thixotropic gel having a viscosity from about 100,000 centipoise to about 5,000,000 centipoise or is a solid which is non-flowable at room temperature.

12 Claims, 1 Drawing Sheet

ANAEROBIC WIRE CONNECTOR SEALANT AND MOISTURE RESISTANT WIRE CONNECTOR CONTAINING THE SAME

FIELD OF THE INVENTION

The present invention relates to moisture and fluid resistant electrical connections and sealant compositions for the same. More particularly, the present invention relates to a wire connector having an anaerobically curable selectively curable to provide a moisture resistant electrical connection.

BRIEF DESCRIPTION OF RELATED TECHNOLOGY

In certain environments, such as below ground, electrical connections are subject to failure due to moisture. Common examples for undergound electrical connections or splice include irrigation and sprinkler systems, landscape lighting and the like.

To provide protection against moisture, electrical connections or splices have been immersed into viscous compounds to prevent or retard the ingress of moisture. For example, U.S. Pat. No. 5,023,402 to King, Jr. et al. describes the placement of silicone grease within a wire connector in an attempt to provide a waterproof electrical connection. The grease, however, tends to migrate from the wire connector over time, thereby allowing corrosion damage due to moisture.

To improve the moisture resistance of an electrical connection, the entire electrical connection, i.e., the wire connector and the connecting wires, may be immersed into a waterproof gel. For example, U.S. Pat. No. 5,038,003 to Allec et al. describes a closeable container having a viscous waterproof gel. The entire wire splice, i.e. the wires and the wire connector connecting the wires, is immersed into the gel, and after immersion the container is closed with snap-on top. Such an arrangement may improve the integrity of the electrical connection over time, but the arrangement is bulky thereby complicating electrical splices and connections.

Curable sealants have also been used in waterproof electrical connections. For example, U.S. Pat. No. 3,889,047 to Carver describes the use of an anaerobic sealant in a waterproof electrical connection. The wires making the electrical connection are twisted together, placed inside a heat-shrinkable sleeve and anaerobic sealant is placed within the sleeve. Heat is applied to the sleeve to shrink the sleeve, whereby the sealant is described as being cured by the exclusion of air. While such an electrical connection may have an advantage in maintaining a waterproof electrical connection, the use of cured sealant within the sleeve makes maintenance difficult. For example, the wires cannot be easily removed from the cured sealant if maintenance is required, and often the wires must be cut away from the electrical connection when maintenance is required.

Thus, there is a need for a waterproof electrical connection without the disadvantages of the prior art. In particular, there is a need for a waterproof electrical connection that is easily used and also easily maintainable and serviceable over time.

SUMMARY OF THE INVENTION

The present invention is directed to waterproof electrical connections and methods for providing the same. The electrical connections of the present invention provide resistance to moisture, i.e., waterproof, while being easily serviceable. Viscous anaerobic sealant, for example thixotropic or gel, or non-flowable, i.e., room temperature solid, anaerobic sealant is used to provide a barrier against the ingress of moisture win an electrical connection, such as a wire connector. The sealant is only cured at the exposed portions of the wires making the electrical connection serviceable, but water proof.

In one aspect of the present invention, a method of providing an electrical connection is provided. The method includes the steps of providing at least two electrical wires having exposed metallic surfaces; providing a wire connector including a housing having a cavity and an insert adapted for engaging the exposed surfaces of the wires disposed within the cavity; providing an anaerobically curable sealant within at least a portion of the cavity; joining exposed metallic surfaces of the at least two electrical wires in contact with one and the other; engaging the exposes surfaces of the joined wires with the metallic insert; and curing only a portion of the anaerobic sealant proximal to the exposed wires and the insert to provide a barrier against ingress of fluid while leaving other portions of the anaerobic sealant in an uncured state. Desirably, the sealant has a viscosity from about 100,000 centipoise to about 5,000,000 centipoise or is a non-flowable solid at room temperature. Desirably, the sealant includes a poly(meth)acrylate ester and/or a polyurethane (meth) acrylate.

In another aspect of the present invention, a waterproof electrical connector is provided. The connector includes a wire connector including a housing having an open end defining a cavity therewithin and an insert having a surface adapted for receiving at least two metallic wires disposed within the cavity of the housing; and uncured anaerobic sealant disposed within the cavity, wherein the uncured sealant includes a polyurethane (meth)acrylate selected from the group consisting of a polyurethane poly(meth)acrylate monomer, a urethane-(meth)acrylate-capped poly(alkylene) ether polyol monomer, and combinations thereof and an alkylene glycol di(meth)acrylate. The connector may further include an air permeable cap disposed over the open end of the housing. Desirably, the sealant has a viscosity from about 100,000 centipoise to about 5,000,000 centipoise or is a non-flowable solid at room temperature.

In another aspect of the present invention a waterproof electrical connection is provided. The connection includes a wire connector including a housing having a cavity and an insert having a surface adapted for receiving at least two metallic wires disposed within the cavity of the housing; at least two metallic wires having exposed metallic surfaces, wherein a portion of the exposed surface of one wire is in contact with a portion of the exposed surface of the second wire, and further wherein a portion of the exposed surface of the at least two wires are in contact with the surface of the insert to define at least one contact point; and an anaerobic sealant disposed within the cavity, wherein only a portion of the anaerobic sealant proximal to the one at least contact point is in a cured state while the remaining sealant is in an uncured state. The connection may further include an air permeable cap disposed over the open end of the housing. Desirably, the sealant has a viscosity from about 100,000 centipoise to about 5,000,000 centipoise or is a solid which is non-flowable at room temperature.

In another aspect of the present invention, a method of producing a waterproof electrical connection is provided. The method includes the steps of providing a wire connector including a housing having a cavity and an insert adapted for engaging exposed surfaces of wires from which an electrical connection may be formed; providing an anaerobically curable sealant within at least a portion of the cavity, wherein the curable sealant includes a polyurethane (meth) acrylate, such as a polyurethane poly(meth)acrylate monomer, a urethane-(meth)acrylate-capped poly(alkylene) ether polyol monomer, and combinations thereof, and an alkylene glycol di(meth)acrylate; and maintaining the curable sealant in a substantially uncured state.

In another aspect of the present invention, a method of producing an electrical connection is provided. The method includes the steps of providing a wire connector including a housing having a cavity and an insert having a surface adapted for engaging exposed surfaces of wires from which an electrical connection may be formed; dispensing an anaerobically curable sealant within at least a portion of the cavity, wherein the curable sealant includes a polyurethane (meth)acrylate, such as a polyurethane poly(meth)acrylate monomer, a urethane-(meth)acrylate-capped poly(alkylene) ether polyol monomer, and combinations thereof, and an alkylene glycol di(meth)acrylate; and inserting at least two metallic wires having exposed metallic surfaces into the insert of the wire connector, wherein a portion of the exposed surface of one wire is in contact with a portion of the exposed surface of the second wire, and further wherein a portion of the exposed surfaces of the at least two wires are in contact with the surface of the insert to define at least one contact point; and curing only a portion of the anaerobic sealant proximal to the one at least contact point; and maintaining the remaining sealant is in an uncured state.

In another aspect of the present invention, an assembly for an electrical connection is provided. The assembly includes a wire connector comprising a housing having a cavity and an insert having a surface adapted for receiving at least two metallic wires disposed within the cavity of the housing; and an anaerobic sealant disposed within assembly, but outside the cavity of the wire connector, wherein the anaerobic sealant is in a substantially uncured state.

DETAILED DESCRIPTION OF THE INVENTION

Figure 1:
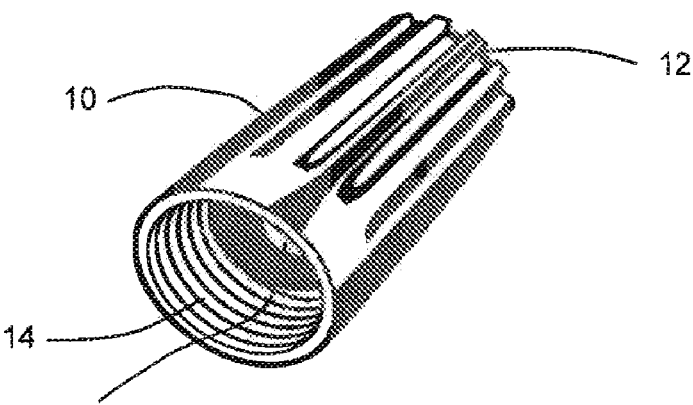
FIG. 1 is a perspective view of a wire connector according to the present invention.

FIG. 1 is a perspective view of an electrical connection 10 according to the resent invention. The electrical connection 10 is a generally cylindrically shaped cap having a closed end 12 and an opposed open 14. The electrical connection 10 is often referred to as a wire connector because it is useful for engaging and securing wires in electrical connection with one and the other. Such wire connectors are commercially available from Ideal Industries, Inc. under the name of Wire-Nut® The connection 10 is typically made or includes non-conductive material, such as a plastic or rubber. Non-limiting examples of useful connection materials include polyolefins or polyamides, for example polypropylenes or Nylon 66.

Figure 2:
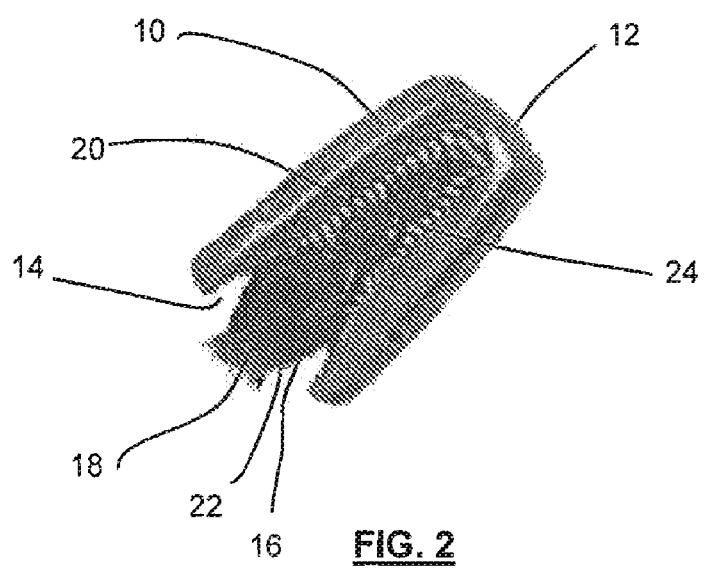
FIG. 2 is a partial cutaway, perspective view of the wire connector of FIG. 1 showing electrical wires disposed within a cavity of the wire connector.

FIG. 2 is a partial cutaway, perspective view of the electrical connection 10 of the present showing a pair of wires 18 disposed within a cavity 16 of the connection 10. The wires 18 typically have covering of insulation 22. The insulation is typically removed from the ends of the wires 20 that are disposed within the cavity 16 toward the closed end 12 of the connector 10. The wires 20 may include any suitable conductive material, such as copper, aluminum, alloys thereof, composites thereof, and the like. Although a pair of wires 18 is depicted in FIG. 2, the present invention is not so limited, and any suitable number of wires useful in making an electrical connection may suitably be used with the present invention.

The electrical connection 10 desirably has a threaded portion 24 for engaging the bare portions 20 of the wires 18. The threaded portion 24 may be a metallic portion to facilitate the mechanical engagement and securement of the wires 20. The threads may be in the form of an insert (not shown) which is molded to the interior of the connections 10. For example, thread inserts, which are also commonly referred to as coil inserts, may be made of plastic or may be molded directly into the connection 10. Desirably, the threaded portion 24 is a metallic threaded portion. Useful but nonlimiting examples of useful metallic threads include tin or zinc plated steel.

Figure 3:
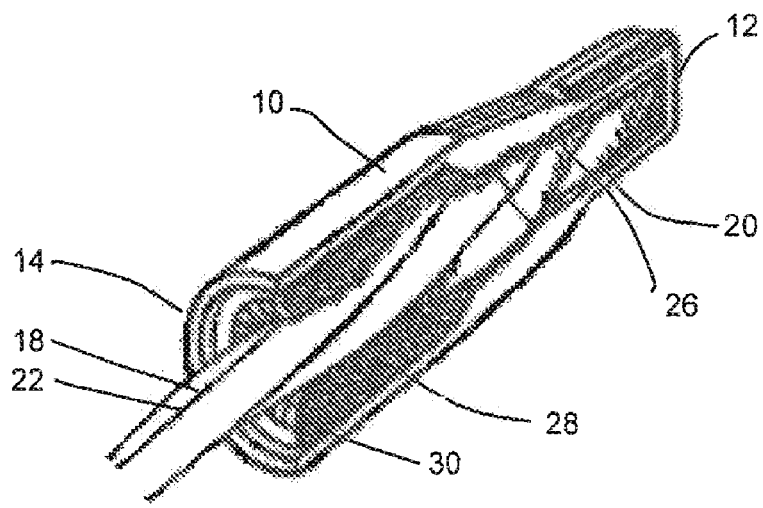
FIG. 3 is a partial cutaway, perspective view of the wire connector of FIG. 2 showing an anaerobically curable sealant and electrical wires disposed within a cavity of the wire connector.

FIG. 3 is a partial cutaway, perspective view of the connection 10 of the present invention showing curable anaerobic sealant 28 disposed within the cavity 16. The curable sealant 28 may be held within the cavity 16 through use of an air permeable cap 30. The cap 30 may be of any suitable materials or construction that permits the ingress of air to prevent curing the curable sealant 28 and prevents or limits the egress of the curable sealant 28. The cap 30 may be an air permeable foil, a plastic cap, a paper cap, a metallic cap, a fabric cap, and combinations thereof. The cap 30 may also be parted or segmented, as depicted in FIG. 3, to facilitate the insertion of the wires 18.

Desirably, the curable sealant 28 is an anaerobically curable sealant. Use of an anaerobically curable sealant advantageously permits use of the air permeable cap 30 to prevent the curing of the sealant within the housing 16 of the connector 10. The anaerobic sealant, however, will cure in locations proximal to the bare metal wire portions 20. For example, as depicted in FIG. 3, cured sealant is disposed proximal to the wire 20. The active metallic surfaces of the wire 20 tend to catalyze the polymerization of the sealant, thereby forming a film or portion of cured sealant in location proximal to the bare wires 20 and distal from the open end 14 of the housing. As a significant amount of the sealant 30 remains uncured, the electrical connection of the present invention is easily disassembled without damage or cutting of the wires 18.

As the cured sealant 26 will tend to encapsulate the bare wires 20 in a thin film, a barrier against the ingress of fluids, e.g. moisture, is provided. In other words, an environmentally sealed electrical connection is made within the housing 14 at the bare wires 20, but such an environmentally sealed electrical connection is also easily serviceable as the thin film barrier of cured sealant 28 is easily broken by, for example, twisting of the wires 18.

Desirably, the monomers used in the present invention are (meth)acrylate monomers. Such monomers are desirably characterized as being either flexible or rigid. It will be apparent to one of ordinary skill in the art that the choice of monomers is dependent on the desired properties of the resultant sealant product. Within the (meth)acrylate component are a wide variety of materials represented by $H_2C\!=\!CGCO_2R^{15}$, where G may be hydrogen, halogen or alkyl of 1 to about 4 carbon atoms, and $R^{15}$ may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulfonate, sulfone and the like.

More specific (meth)acrylate monomers particularly desirable for use herein include polyethylene glycol di(meth)acrylates, desirably triethyleneglycol di(meth)acrylate, hydroxypropyl (meth)acrylate, bisphenol-A di(meth) acrylates, such as ethoxylated bisphenol-A (meth)acrylate ("EBIPA" OR "EBIPMA"), and tetrahydrofuran (meth) acrylates and di(meth)acrylates, citronellyl acrylate and citronellyl methacrylate, hexanediol di(meth)acrylate ("HDDA" or "HDDMA"), trimethylol propane tri(meth) acrylate, tetrahydrodicyclopentadienyl (meth)acrylate, ethoxylated trimethylol propane triacrylate ("ETTA"), triethylene glycol diacrylate and triethylene glycol dimethacrylate ("TRIEGMA").

For purposes of illustration only, listed herein are examples of urethane-acrylate monomers suitable for use in the present invention. However, it is to be understood that any acrylate resin, including non-urethane acrylates and methacrylates may be used in the present invention. Desirably, monomers used in the present invention are polyurethane polyacrylate monomers. Examples of such monomers are described in U.S. Pat. No. 3,425,988 to Gorman et al., specifically incorporated by reference herein. These monomers may be represented by the following general formula:

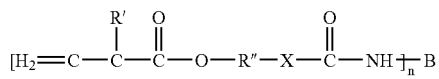

where B is a polyvalent organic radical selected from alkyl, alkenyl, cycloalkyl, aryl, aralkyl, alkaryl and heterocyclic radicals both substituted and unsubstituted; X is selected from —O— and

radicals; n is an integer from 2 to 6 inclusive; R' is a member selected from hydrogen, chlorine and methyl and ethyl radicals; and R" is a divalent organic radical selected from lower alkylene of 1 to 8 carbon atoms, phenylene and naphthalene radicals.

Additional urethane-acrylate-capped poly(alkylene) ether polyol monomers, such as those described in U.S. Pat. No. 4,018,851 to Baccei, specifically incorporated by reference herein, may be used in the present invention. Such monomers may be represented by the following formula:

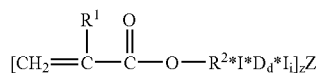

where $R^1$ is selected from hydrogen, chlorine and methyl and ethyl radicals; $R^2$ is a divalent organic radical selected from lower alkylene of 1-8 carbon atoms, phenylene and naphthalene; I is a polyisocyanate radical; D is an aromatic, heterocyclic or cycloaliphatic polyol or polyamine radical, desirably a diol, and more desirably a diol of a cycloaliphatic compound; Z is a polymeric or copolymeric grafted alkylene ether polyol or alkylene ether polyol radical; z is an integer corresponding to the valency of Z; d is either 1 or 0; and i is 0 when d is 0, and otherwise equal to one less than the number of reactive hydrogen atoms of D. As used herein, an asterisk (*) indicates a urethane (—N—H—COO—) or ureide (—NH—CO—NH—) bond.

Further, urethane-acrylate-capped polybutadiene-based monomers, such as those described in U.S. Pat. No. 4,295,909 to Baccei, specifically incorporated by reference herein, may be used in the present invention. Such polymers may be represented generally by the following formula:

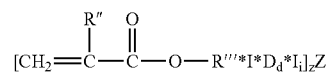

where R" is selected from hydrogen, chlorine and methyl and ethyl radicals; R''' is a divalent organic radical selected from the group consisting of lower alkylene of 1-8 carbon atoms, phenylene and naphthalene; I is a polyisocyanate radical; D is an aromatic, heterocyclic or cycloaliphatic polyol or polyamine radical, desirably a diol of a cycloaliphatic compound; Z is a polymeric or copolymeric polyol or poly radical of butadiene, the latter having a degree of polymerization of from about 5 to 150 and at least about 70 percent of the polybutadiene portion of the 1,4-configuration; z is an integer corresponding to the valency of Z; d is either 1 or 0; and i is 0 when d is 0, and otherwise is equal to one less than the number of reactive hydrogen atoms of D. As used herein, an asterisk (*) indicates a urethane (—N—H—COO—) or ureide (—NH—CO—NH—) bond.

Additional anaerobic curing monomers useful in the present invention include the alkylene glycol diacrylates having the general formula:

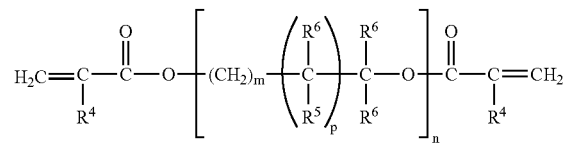

where $R^6$ represents a radical selected from the group consisting of hydrogen, lower alkyl of 1-4 carbon atoms, inclusive, hydroxyalkyl of 1-4 carbon atoms inclusive, and

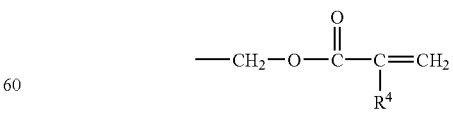

where $R^4$ is a radical selected from the group consisting of hydrogen, halogen, and lower alkyl of 1-4 carbon atoms; $R^5$ is a radical selected from the group consisting of hydrogen, —OH and

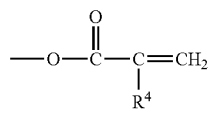

m is an integer equal to at least 1, desirably 1-8 and more desirably from 1 to 4; n is an integer equal to at least 1, desirably 1 to 20; and p is 0 or 1.

Typical of these monomers are mono-, di-, tri-, tetra- and polyethylene glycol dimethacrylate and the corresponding diacrylates; di(pentamethylene glycol) dimethacrylate; tetraethylene glycol di(chloroacrylate); diglycerol diacrylate; diglycerol tetramethacrylate; butylene glycol dimethacrylate; neopentyl glycol diacrylate; and trimethylopropane triacrylate.

Useful polymerizable crosslinkable components are ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopentyl glycoldiacrylate, pentaerythritol tetraacrylate, 1,2-butylene glycoldiacrylate, trimethylopropane ethoxylate tri(meth)acrylate, glyceryl propoxylate tri(meth)acrylate, trimethylolpropane tri(meth)acrylate, dipentaerythritol monohydroxy penta(meth)acrylate, tri(propylene glycol) di(meth)acrylate, neopentylglycol propoxylate di(meth)acrylate, 1,4-butanediol di(meth)acrylate, polyethyleneglycol di(meth)acrylate, triethyleneglycol di(meth)acrylate, butylene glycol di(meth)acrylate, ethoxylated bisphenol A di(meth)acrylate and combinations thereof.

Other useful monomers include those acrylates derived from bisphenol-A, such as bisphenol-A dimethacrylate, hydrogenated bisphenol-A dimethacrylate, and ethoxylated bisphenol-A di(meth)acrylate.

While di- and other polyacrylate esters have been found particularly desirable, monofunctional acrylate esters (esters containing one acrylate group) also may be used. When dealing with monofunctional acrylate esters, it is desirable to use an ester which has a relatively polar alcoholic moiety. Such materials are less volatile than low molecular weight alkyl esters and, more importantly, the polar group tends to provide intermolecular attraction during and after cure, thus producing more desirable cure properties, as well as a more durable sealant or adhesive. Particularly desirable are the polar groups selected from labile hydrogen, heterocyclic ring, hydroxy, amino, cyano, and halogen polar groups. Useful examples of compounds within this category include cyclohexyl methacrylate, tetrahydrofurfuryl methacrylate, hydroxyethyl acrylate, hydroxypropyl methacrylate, t-butylaminoethyl methacrylate, cyanoethylacrylate, and chloroethyl methacrylate. The materials are often incorporated as reactive diluents which are capable of copolymerizing with the various other polymerizable materials.

Anaerobic cure-inducing compositions are also useful in the sealant compositions of the present invention. These compositions include a variety of components, such as amines (including amine oxides, sulfonamides and triazines). A desirable composition to induce cure in the inventive sealant compositions includes saccharin, toluidenes, such as N,N-diethyl-p-toluidene and N,N-dimethyl-o-toluidene, acetyl phenylhydrazine, and maleic acid. Of course, other materials known to induce anaerobic cure may also be included or substituted therefor. See e.g., U.S. Pat. No. 3,218,305 (Krieble), U.S. Pat. No. 4,180,640 (Melody), U.S. Pat. No. 4,287,330 (Rich) and U.S. Pat. No. 4,321,349 (Rich). Quinones, such as napthoquinone and anthraquinone, may also be included to scavenge free radicals which form. Other components for such cure compositions may be found in U.S. Pat. Nos. 6,835,762 and 6,897,277.

The sealant compositions of the present invention may be liquid, such as a viscous liquid, a gel, a thixotropic fluid or gel and/or a non-flowable solid. Desirably, the sealant has a viscosity from about 100,000 centipoise to about 5,000,000 centipoise or is a solid which is non-flowable at room temperature. The sealant composition may include a polymeric matrix which provides dimensional stability.

The polymeric matrix may include an organic material which generally has a melting point or softening point range in the range of about 200° F. (93° C.) to about 500° F. (260° C.), more desirably greater than 250° F. (121° C.) to about 500° F. (260° C.). Polymeric materials useful in the present invention may be selected from urea-urethanes, hydroxy or amine modified aliphatic hydrocarbons (such as castor oil-based rheological additives, including but not limited to THIXCIN R, THIXCIN GR, THIXATROL ST and THIXATROL GST available from Rheox Inc., Hightstown, N.J.), liquid polyester-amide-based rheological additives (including but not limited to THIXATROL TSR, THIXATROL SR and THIXATROL VF rheological additives available from Rheox Inc., Hightstown, N.J.) and combinations thereof.

Of particular utility for the polymeric matrix are polyamide materials having a melting point of about 260° F. (127° C.). One such polyamide is commercially available as a non-reactive free flowing powder under the tradename DISPARLON 6200, from King Industries Specialties Company, Norwalk, Conn. Other polyamides include DISPARLON 6100 and 6500. The present invention includes the presence of the polymeric matrix in amounts of about 2% to about 30% by weight of the total composition. The polymeric matrix may further include polyamides, polyacrylamides, polyimides, and polyhydroxyalkylacrylates. The polyamide materials desirably have a particle size less than about 15 microns, although other particle sizes are useful. Additional details of useful polymeric matrix compositions and methods for making and/or employing the same may be found in U.S. Pat. Nos. 6,451,927 and 6,727,320 and in U.S. patent application Ser. No. 10/443,765, filed Aug. 18, 2003, and Ser. No. 11/067,775, filed Mar. 1, 2005, the contents of all of which are incorporated herein by reference.

Other materials can be added to the polymerizable monomers. Anaerobic polymerizable compositions typically employ stabilizers, accelerators, thickeners, coloring agents and the like in suitable amounts for their intended purposes.

Inhibitors and chelators, well recognized in the art for imparting stability to polymerizable compositions, are recommended. It is preferred that they be added to the composition prior to adding the polymeric matrix material. Those inhibitors useful in the present composition may be selected from any of the known inhibitors including those selected from hydroquinones, benzoquinones, naphthoquinones, phenanthraquinones, anthraquinones, and substituted compounds of any of these. Among the chelators which may be optionally present in the adhesive composition are the beta-diketones, ethylenediamine tetraacetic acid ("EDTA") and the sodium salt of EDTA. Both the inhibitors and chelators may be effectively employed in levels of about 0.1 to about 1% by weight of the monomer, without adversely affecting the speed of cure of the polymerizable adhesive composition.

Thickeners, plasticizers, pigments, dyes, diluents, fillers, and other agents common to the art can be employed in any reasonable manner to produce desired functional characteristics, providing they do not significantly interfere with the sealant functionality. Fillers which add lubricity and/or sealing characteristics to the compositions are useful. TEFLON (polytetrafluoroethylene) and polyethylene are non-limiting examples.

In one aspect of the present invention, a method of providing an electrical connection is provided. The method includes the steps of providing at least two electrical wires having exposed metallic surfaces; providing a wire connector including a housing having a cavity and an insert adapted for engaging the exposed surfaces of the wires disposed within the cavity; providing an anaerobically curable sealant within at least a portion of the cavity; joining exposed metallic surfaces of the at least two electrical wires in contact with one and the other; engaging the exposes surfaces of the joined wires with the metallic insert; and curing only a portion of the anaerobic sealant proximal to the exposed wires and the insert to provide a barrier against ingress of fluid while leaving other portions of the anaerobic sealant in an uncured state. Desirably, the sealant has a viscosity from about 100,000 centipoise to about 5,000,000 centipoise or is a non-flowable solid at room temperature. Desirably, the sealant includes a poly(meth)acrylate ester and/or a polyurethane (meth) acrylate. The anaerobically curable sealant may include an anaerobic cure-inducing composition.

In another aspect of the present invention, a waterproof electrical connector is provided. The connector includes a wire connector including a housing having an open end defining a cavity therewithin and an insert having a surface adapted for receiving at least two metallic wires disposed within the cavity of the housing; and uncured anaerobic sealant disposed within the cavity, wherein the uncured sealant includes a polyurethane (meth)acrylate selected from a polyurethane poly(meth)acrylate monomer, a urethane-(meth)acrylate-capped poly(alkylene) ether polyol monomer, and combinations thereof and an alkylene glycol di(meth)acrylate. The connector may further include an air permeable cap disposed over the open end of the housing. Desirably, the sealant has a viscosity from about 100,000 centipoise to about 5,000,000 centipoise or is a non-flowable solid at room temperature. The anaerobically curable sealant may include an anaerobic cure-inducing composition.

In another aspect of the present invention a waterproof electrical connection is provided. The connection includes a wire connector including a housing having a cavity and an insert having a surface adapted for receiving at least two metallic wires disposed within the cavity of the housing; at least two metallic wires having exposed metallic surfaces, wherein a portion of the exposed surface of one wire is in contact with a portion of the exposed surface of the second wire, and further wherein a portion of the exposed surfaces of the at least two wires are in contact with the surface of the insert to define at least one contact point; and an anaerobic sealant disposed within the cavity, wherein only a portion of the anaerobic sealant proximal to the one at least contact point is in a cured state while the remaining sealant is in an uncured state. The connection may further include an air permeable cap disposed over the open end of the housing. Desirably, the sealant has a viscosity from about 100,000 centipoise to about 5,000,000 centipoise or is a solid which is non-flowable at room temperature. The anaerobically curable sealant may include an anaerobic cure-inducing composition.

In another aspect of the present invention, a method of producing a waterproof electrical connection is provided. The method includes the steps of providing a wire connector including a housing having a cavity and an insert adapted for engaging exposed surfaces of wires from which an electrical connection may be formed; providing an anaerobically curable sealant within at least a portion of the cavity, where the curable sealant includes a polyurethane (meth)acrylate selected from a polyurethane poly(meth)acrylate monomer, a urethane-(meth)acrylate-capped poly(alkylene) ether polyol monomer, and combinations thereof and an alkylene glycol di(meth)acrylate; and maintaining the curable sealant in a substantially uncured state. The anaerobically curable sealant may include an anaerobic cure-inducing composition. The method of this aspect of the present invention may further include the step of inserting at least two metallic wires having exposed metallic surfaces into the insert of the wire connector, wherein a portion of the exposed surface of one wire is in contact with a portion of the exposed surface of the second wire, and further wherein a portion of the exposed surfaces of the at least two wires are in contact with a surface of the insert to define at least one contact point. The method of this aspect of the present invention may further include the step of curing only a portion of the anaerobic sealant proximal to the one at least contact point.

In another aspect of the present invention, a method of producing an electrical connection is provided. The method includes the steps of providing a wire connector including a housing having a cavity and an insert having a surface adapted for engaging exposed surfaces of wires from which an electrical connection may be formed; dispensing an anaerobically curable sealant within at least a portion of the cavity, wherein the curable sealant includes a polyurethane (meth)acrylate selected from a polyurethane poly(meth) acrylate monomer, a urethane-(meth)acrylate-capped poly (alkylene) ether polyol monomer, and combinations thereof and an alkylene glycol di(meth)acrylate; and inserting at least two metallic wires having exposed metallic surfaces into the insert of the wire connector, wherein a portion of the exposed surface of one wire is in contact with a portion of the exposed surface of the second wire, and further wherein a portion of the exposed surfaces of the at least two wires are in contact with the surface of the insert to define at least one contact point; and curing only a portion of the anaerobic sealant proximal to the one at least contact point; and maintaining the remaining sealant is in an uncured state.

In another aspect of the present invention, an assembly for an electrical connection is provided. The assembly includes a wire connector comprising a housing having a cavity and an insert having a surface adapted for receiving at least two metallic wires disposed within the cavity of the housing; and an anaerobic sealant disposed within assembly, but outside the cavity of the wire connector, wherein the anaerobic sealant is in a substantially uncured state. The anaerobic sealant may be disposed within an air permeable container, such as a tube, suitable for dispensing the sealant into the wire nut after removal from the assembly.

EXAMPLES

Commercially available wire connectors made from polypropylene and polyamide, i.e., Nylon 66, were obtained. The wire connectors included tin and zinc plated steel threads. A thixotropic anaerobic sealant having a composition as described in Table 1 below was applied into the cavities of the wire connectors.

TABLE 1

Inventive Composition 1: Anaerobically Curable Sealant[1]

| Description: | Weight Percent |
|---|---|
| Polyurethane methacrylate resin | 60-100 |
| Polyglycol dimethacrylate | 10-30 |
| Silica, amorphous, fumed, crystalline-free | 5-10 |
| Acrylic acid | 1-5 |
| Cumeme hydroperoxide | 1-5 |
| Ethylene glycol | 1-5 |
| 1-Acetyl-2-phenylhydrazine | 0.1-1 |
| Viscosity, Brookfield - HBT (Helipath) at 25° C., mPas | |
| Spindle TC at 0.5 rpm | 2,500,000 to 5,000,000 |
| Spindle TC at 5.0 rpm | 500,000 to 1,000,000 |

Notes:
[1]Commercially available from Henkel Corporation as LOCTITE ® 518™

The sealant was retained within the cavities of the wire connectors and was exposed to the air. Twisted pairs of copper wires having exposed or bare portions were inserted into the sealant-filled cavities. The sealant remained substantially uncured.

The twisted wires were removed by hand from the sealant-filled wire connectors. Cured sealant was observed on a portion of the exposed wires and on a portion of the metallic threads of the electrical connectors.

The sealant composition provided excellent moisture and fluid resistance to the wire connectors.

What is claimed is:

1. A method of providing an electrical connection comprising:
    providing at least two electrical wires having exposed metallic surfaces;
    providing a wire connector comprising a housing having a cavity and an insert adapted for engaging the exposed surfaces of the wires disposed within the cavity;
    providing an anaerobically curable sealant within at least a portion of the cavity;
    joining exposed metallic surfaces of the at least two electrical wires in contact with one and the other;
    engaging the exposes surfaces of the joined wires with the metallic insert; and
    curing only a portion of the anaerobic sealant proximal to said exposed wires and said insert to provide a barrier against ingress of fluid while leaving other portions of the anaerobic sealant in an uncured state.

2. The method of claim 1, wherein the sealant has a viscosity from about 100,000 centipoise to about 5,000,000 centipoise.

3. The method of claim 1, wherein the sealant comprises a poly(meth)acrylate ester.

4. The method of claim 1, wherein the sealant comprises a polyurethane (meth)acrylate.

5. An electrical connector comprising:
    a wire connector comprising a housing having an open end defining a cavity therewithin and an insert having a surface adapted for receiving at least two metallic wires disposed within the cavity of the housing; and
    uncured anaerobic sealant disposed within the cavity, wherein the uncured sealant comprises a polyurethane (meth)acrylate selected from the group consisting of a polyurethane poly(meth)acrylate monomer, a urethane-(meth)acrylate-capped poly(alkylene) ether polyol monomer, and combinations thereof and an alkylene glycol di(meth)acrylate.

6. The connector of claim 5, further comprising an air permeable cap disposed over the open end of the housing.

7. The connector of claim 5, wherein the sealant has a viscosity from about 100,000 centipoise to about 5,000,000 centipoise.

8. The connector of claim 5, wherein said sealant is a solid which is non-flowable at room temperature.

9. An electrical connection comprising:
    a wire connector comprising a housing having a cavity and an insert having a surface adapted for receiving at least two metallic wires disposed within the cavity of the housing;
    at least two metallic wires having exposed metallic surfaces, wherein a portion of the exposed surface of one wire is in contact with a portion of the exposed surface of the second wire, and further wherein a portion of the exposed surfaces of the at least two wires are in contact with the surface of the insert to define at least one contact point; and
    an anaerobic sealant disposed within the cavity, wherein only a portion of the anaerobic sealant proximal to the one at least contact point is in a cured state while the remaining sealant is in an uncured state.

10. The connection of claim 9, further comprising an air permeable cap disposed over the open end of the housing.

11. The connection of claim 9, wherein the sealant has a viscosity from about 100,000 centipoise to about 5,000,000 centipoise.

12. The connection of claim 9, wherein said sealant is a solid which is non-flowable at room temperature.

* * * * *